Patented Sept. 12, 1950

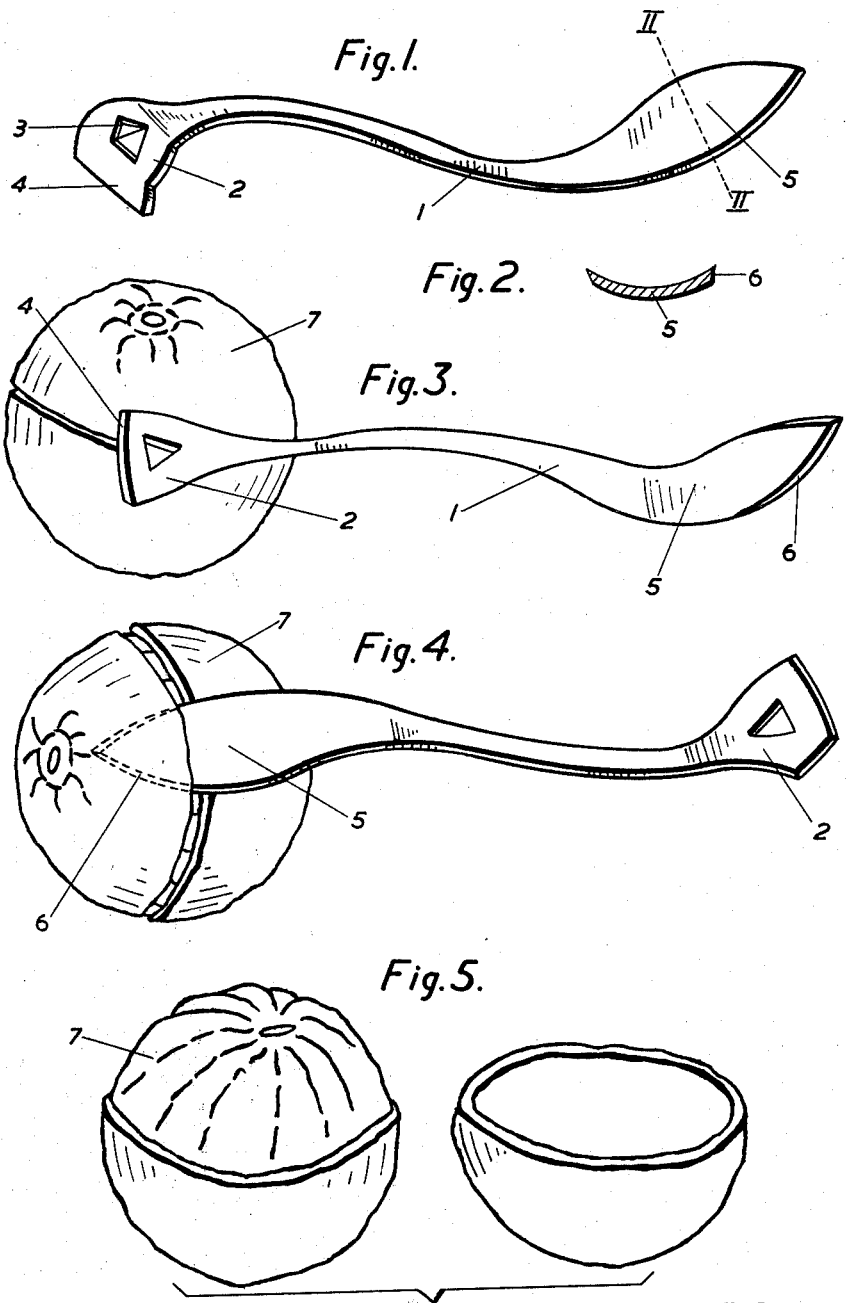

2,522,054

UNITED STATES PATENT OFFICE 2,522,054

APPLIANCE FOR PEELING FRUIT SUCH AS ORANGES, LEMONS, AND GRAPEFRUIT

Václav Novák, Prague, Czechoslovakia

Application June 7, 1948, Serial No. 31,594
In Czechoslovakia January 15, 1948

1 Claim. (Cl. 146—3)

This invention relates to an appliance for peeling fruit such as oranges, lemons, and grape-fruit.

Knives or other sharp instruments have been used for this purpose but quite often the skin of the fruit becomes torn off in pieces. When peeling such fruit by hand or with a knife the orange is often damaged, the peel being torn as well as the underlayer of skin; the hands are stained with orange or other juice and infection can thus easily attack the fruit. This method is very unhygienic especially if the fruit is bought whilst travelling on a journey where neither the fruit nor the hands can be readily washed previously.

According to the present invention the appliance peels the fruit without damaging the peel or the under-skin and two semi-globular cups are produced which can serve for filling with fruit and so on. The appliance consists of a handle-like member similar to that of a spoon or fork having at one end a head forming a guide and provided with a sharp point while the other end is axially and transversely curved to embrace the round shape of the fruit the rims or edges of the ends being blunt.

The accompanying drawing shows a simple form of the appliance according to the invention wherein:

Figure 1 is a perspective view; Fig. 2 is a section taken on the line II—II of Figure 1; Fig. 3 shows the appliance in the position after the cutting operation; Fig. 4 shows the position of the appliance when peeling and Fig. 5 shows an orange treated with the appliance with one half of the peel removed.

The appliance consists of a handle-like member 1 having a downwardly-curved end 2. 3 is an upwardly-facing sharp-pointed triangular portion bent inwardly toward the handle and spaced from the end 2 with a base-edge parallel to the surface of the end 2 so as to lie at an angle thereto to form a cutter. 4 is a downwardly-curved widened head on the end 2 which when the cutter is inserted into the peel 7 of the fruit lies against the peel and thereby serves as a guide to regulate the depth to which the cutter penetrates therein. The other end of the handle-like member 1 is axially and transversely curved to embrace the round form of the fruit and can be inserted through a cut made by the cutter to engage between the peel and the fruit to allow the peel to be lifted away from the fruit proper. The end 5 has blunt edges 6 whereby when it is engaged between the peel 7 and the fruit proper, the peel is separated from the fruit without being cut.

The fruit is peeled as follows: The peel is cut by first pressing in the cutter portion 3 about 4 mm. above the area of the head, then simply turning the fruit which is kept pressed against the head. After this the appliance is reversed and the end 5 is engaged beneath the peel moving it round and at the same time constantly pressing it inwardly towards the top of the fruit. During this movement the core where the stem has been, is cut. Half the peel in the shape of a cup or dish is removed in this way without damage thereto or to the fruit itself. The other half is similarly removed. The blunt edges 6 do not cut the peel but simply separate it from the flesh.

I claim:

A combined cutter and peeler for fruit such as oranges, comprising a handle-like member, a downwardly-curved end therefor, an upwardly-facing sharp-pointed triangular portion bent inwardly toward said handle and spaced from said end with a base edge parallel to the surface of the end and so as to lie at an angle to the end thereby to form a cutter, a downwardly-curved widened head on said downwardly curved end which when the cutter is inserted into the peel of the fruit lies against the peel and thereby serves as a guide to regulate the depth to which the cutter penetrates therein, the other end for the handle-like member axially and transversely curved to embrace the round form of the fruit and which can be inserted through a cut made by the cutter to engage between the peel and the fruit to allow the peel to be lifted away from the fruit proper, and blunt edges on said axially and transversely curved end whereby when the said end is engaged between the peel and the fruit proper the peel is separated from the fruit without being cut.

VÁCLAV NOVÁK.

REFERENCES CITED

The following references are of record in the file of this patent:

UNITED STATES PATENTS

| Number | Name | Date |
|---|---|---|
| 1,277,148 | Starr | Aug. 27, 1918 |
| 1,514,237 | Tenney | Nov. 4, 1924 |
| 2,309,177 | Eifler | Jan. 26, 1943 |

FOREIGN PATENTS

| Number | Country | Date |
|---|---|---|
| 564,937 | France | Oct. 31, 1923 |
| 45,667 | Norway | Oct. 8, 1928 |